United States Patent
Hamilton et al.

(10) Patent No.: US 7,430,793 B2
(45) Date of Patent: Oct. 7, 2008

(54) APPARATUS FOR SECURING A TRIM COVER WITH A FOAM PAD AND METHOD OF USING THE SAME

(75) Inventors: Larry Hamilton, Marine City, MI (US); Brian Zapalski, Milford, MI (US); Don Hamilton, Commerce, MI (US); James Szura, Westland, MI (US)

(73) Assignee: Lear Corporation, Southfield, MI (US)

( * ) Notice: Subject to any disclaimer, the term of this patent is extended or adjusted under 35 U.S.C. 154(b) by 476 days.

(21) Appl. No.: 11/161,149

(22) Filed: Jul. 25, 2005

(65) Prior Publication Data

US 2007/0017080 A1   Jan. 25, 2007

(51) Int. Cl.
*B68G 7/00* (2006.01)

(52) U.S. Cl. .............................. 29/91; 29/787; 29/795; 29/559; 29/281.1; 29/91.1; 29/464; 269/296; 269/37

(58) Field of Classification Search .................. 29/432, 29/464, 468, 559, 711, 783, 787, 795, 281.1, 29/91.1, 91, 91.5; 269/296, 37
See application file for complete search history.

(56) References Cited

U.S. PATENT DOCUMENTS

| | | | |
|---|---|---|---|
| 5,338,386 A | 8/1994 | Frelich et al. | 156/290 |
| 5,643,385 A | 7/1997 | Kikuchi et al. | 156/212 |
| 5,891,293 A | 4/1999 | Kelly et al. | 156/285 |
| 5,900,303 A | 5/1999 | Billarant | 428/100 |
| 6,083,337 A | 7/2000 | Bailey et al. | 156/212 |
| 6,434,806 B1 | 8/2002 | Walt, II | 29/91.5 |
| 6,629,346 B2 * | 10/2003 | Tillner | 29/91 |
| 6,842,950 B2 | 1/2005 | Fleuchaus et al. | 24/442 |
| 7,111,373 B2 * | 9/2006 | Shimano et al. | 29/91.5 |

* cited by examiner

*Primary Examiner*—Essama Omgba
(74) *Attorney, Agent, or Firm*—Wood, Herron & Evans, L.L.P.

(57) ABSTRACT

An apparatus for securing a trim cover to a foam pad includes a base and a platform coupled thereto that defines a working surface for supporting the foam pad thereon. A plurality of actuators project from the working surface. Each actuator is capable of movement away from and toward the working surface and includes a pair of retaining fingers capable of movement between an open and closed position. In use, the retaining fingers grasp a first connecting member on the trim cover and move the first connecting member toward the working surface as the actuators are moved toward the working surface so as to engage the first connecting member with a second connecting member in the foam pad thereby securing the trim cover to the foam pad.

8 Claims, 4 Drawing Sheets

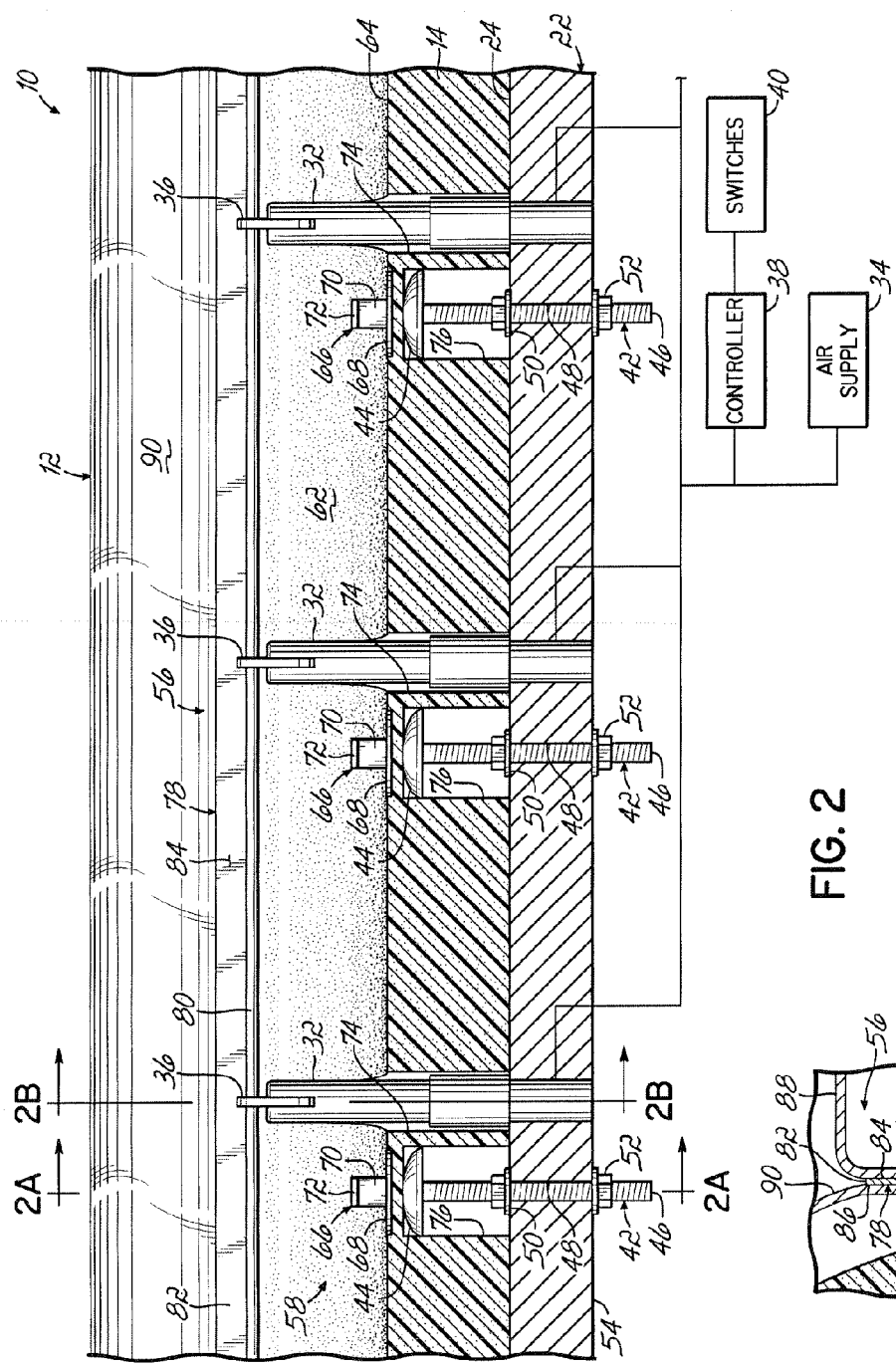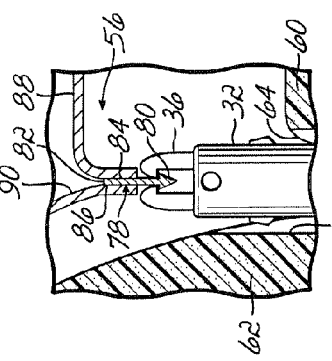

APPARATUS FOR SECURING A TRIM COVER WITH A FOAM PAD AND METHOD OF USING THE SAME

FIELD OF THE INVENTION

The present invention pertains generally to an apparatus for making a seat cushion, and more particularly to an apparatus for securing a trim cover to a foam pad of the type utilized for seating and back cushions on automotive seats.

BACKGROUND OF THE INVENTION

Many surfaces within a passenger compartment of a motor vehicle require padding for comfort reasons. For instance, an automotive vehicle includes seat assemblies for supporting occupants within the vehicle above the floorpan. Typically, a seat assembly includes a seat cushion and a seat back each comprising a foam pad. Aesthetically, materials used to make the foam pads lack the desired finish and durability. Therefore, trim covers are employed to cover the foam padding so the look, feel and durability of the padded seat cushion meets the demands and expectations of car manufacturers and consumers.

Trim covers are attached to the foam pad of seat cushions in a variety of ways. Some of the most common ways include the use of hook and loop fasteners, adhesives, hog rings, drawstrings and other devices and methods. An example of such a method is shown in U.S. Pat. No. 4,692,199 which discloses a particularly well-adapted method of making a fabric covered foam article. The patent specifically discloses a method wherein vacuum pressure is applied to a porous contoured mold in order to draw an impervious adhesive film against a cloth fabric layer to conform the cloth fabric layer to the contours of the mold surface. A matching cellular foam pad is placed in mating engagement with the adhesive film as it is held to the contour of a mold surface by the vacuum pressure. The foam pad is compressed against the mold by a perforated platen and held in place as the vacuum pressure is discontinued. Steam is then supplied through the porous mold to heat and diffuse the adhesive film into the adjacent fabric layer and cellular foam pad for adhesively securing the two together. Vacuum pressure is then applied for removing moisture by drawing air through the perforations of the platen, the foam pad, the fabric layer and porous mold.

Another method of securing a trim cover to a piece of molded foam, such as in a seat cushion, is to mold fasteners into the foam pad as it is molded and cured. In this securing method, a fastener, such as one of a hook or loop fastener extends along a portion of the foam pad surface. For instance, the fasteners may be placed in a trench between different contoured surfaces of the foam pad. A complementary fastener, i.e., the other of the hook or loop fastener, extends along the inner surface of the trim cover. The trim cover is then placed around the foam pad so that the fasteners engage one another and thereby secure the trim cover with the foam pad. To this end, an operator may take a blunt edged tool, such as a putty knife, and push the trim cover into the trench in the foam pad so as to pull the trim cover tight over the foam pad and to engage the fasteners.

These methods, however, have some drawbacks. In particular, these methods are expensive and/or labor intensive. In some of these methods, significant equipment and other tooling requirements are needed to practice the process. In other methods, much of the process is done manually. For example, the hook and loop fastening system as described above typically is achieved through a manual process. Manual processing steps not only increases the labor costs associated with the seat assembly but also limit the production rate.

There is thus a need for an apparatus for securing a trim cover with a foam pad and a method of using the same that overcomes these and other disadvantages and shortcomings of present devices and methods.

SUMMARY OF THE INVENTION

The present invention provides an improved apparatus for securing a trim cover to a foam pad. The apparatus includes a base and a platform coupled to the base that defines a working surface for supporting the foam pad thereon. A plurality of actuators project from the working surface and are adapted to extend through apertures in the foam pad. Each of the actuators is capable of movement away from and toward the working surface and include a pair of retaining fingers on one end thereof which are capable of movement between an open position and a closed position. The retaining fingers are adapted to grasp a first connecting member on the trim cover and move the first connecting member toward the working surface as the actuators are moved toward the working surface so as to engage the first connecting member with a second connecting member on the foam pad to secure the trim cover with the foam pad.

In an exemplary embodiment of the invention, the platform is pivotally coupled with the base so that the angle the platform makes with the base may be selectively changed and thereby provide a more ergonomic apparatus. Additionally, the actuators may be linear actuators that move in a direction substantially perpendicular to the working surface. The actuators may be driven in any suitable manner as is known in the art but are preferably pneumatic actuators. To control the movement of the actuators and the retaining fingers, the apparatus may include a controller. The controller may include one or more switches, such as a banner switch, foot pedal or other hand or finger switches known in the art, for moving the actuators and/or retaining fingers. For instance, activation of a switch may open and close the retaining fingers. Likewise, activation of the switch may move the actuators away from and toward the working surface. Alternately, the movement of the actuators and/or retaining fingers may be automated by, for example, programming the controller to move the actuators and retaining fingers in a timed sequence.

The exemplary embodiment of the invention may also include a plurality of supports projecting from the working surface. The supports are adapted to support the second connecting member in the foam pad during engagement of the first connecting member with the second connecting member. Because the foam pad is deformable, the supports limit the movement of the second connecting members during the securing process. The supports may be adjustable so as to selectively change the height of the support with respect to the working surface. Moreover, each of the supports may be positioned adjacent an associated actuator.

A method of using the apparatus includes placing the trim cover over the foam pad so that the first connecting member on the trim cover aligns with the second connecting member in the foam pad and then moving the actuators to couple the first connecting member with the second connecting member. To this end, the actuators are moved in a first direction, such as away from the working surface. The retaining fingers are then moved to a closed position so as to grasp the first connecting member on the trim cover thereby engaging the first connecting member with the actuators. The actuators are then moved in a second direction, such as toward the working surface, so as to engage the first connecting member with the second connecting member in the foam pad. The retaining fingers on the actuators are then moved to an open position so as to release the first connecting member from the actuators.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain certain embodiments of the invention.

FIG. 2 is a partial cross-sectional view of the apparatus of FIG. 1 with the trim cover overlying the foam pad and the actuators grasping the first connecting member;

FIG. 2B is a partial cross-sectional view of FIG. 2 generally along line 2B-2B;

DETAILED DESCRIPTION OF THE DRAWINGS

Figure 1:
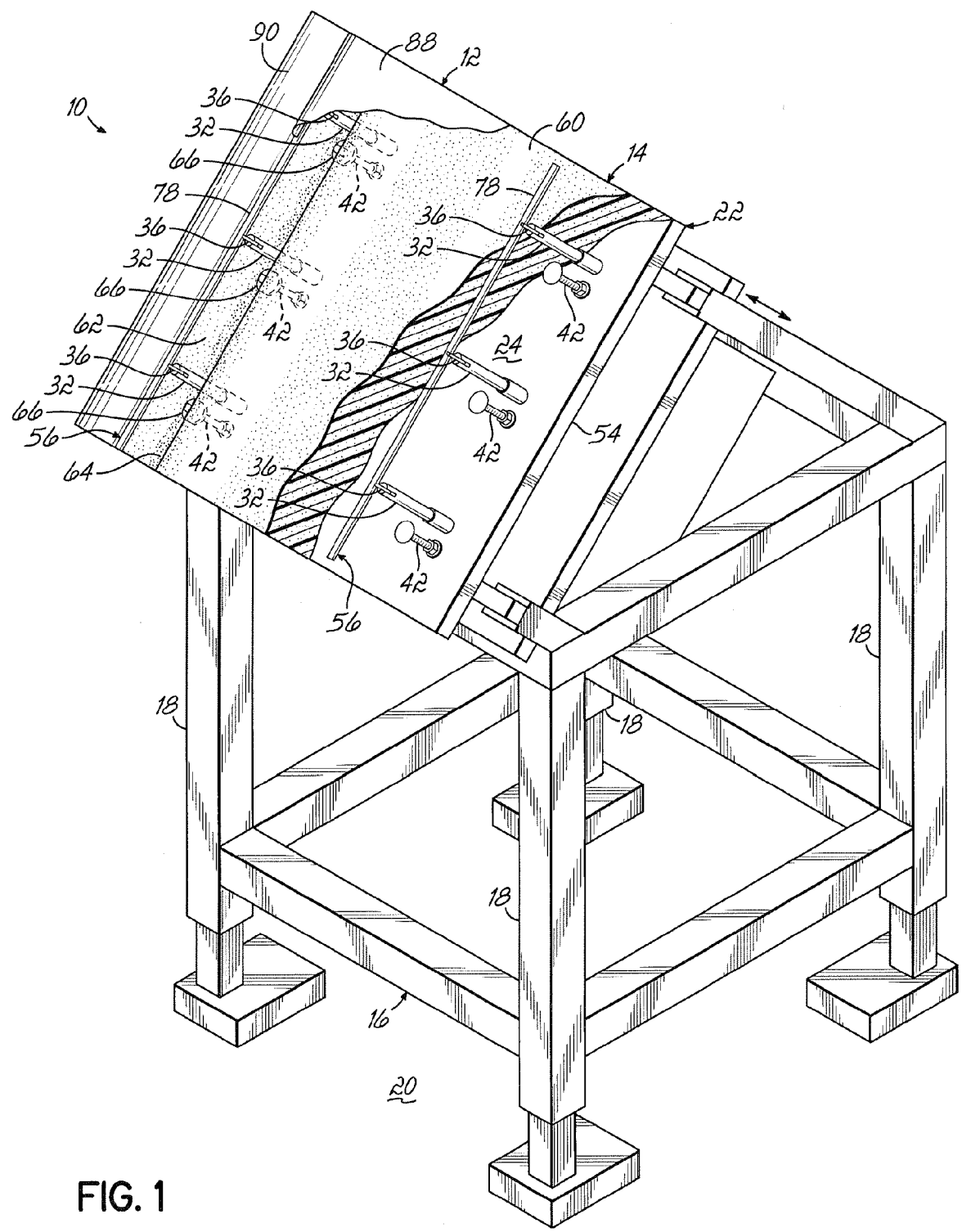
FIG. 1 is a perspective view of an apparatus in accordance with the invention.

With reference to FIG. 1, an apparatus 10 for securing a trim cover 12 with a foam pad 14, such as for an automotive seat or back cushion or any other padded interior component of a vehicle, includes a base 16 having a plurality of legs 18 adapted to engage the ground 20, such as the floor of an automotive factory, at a bottom end thereof. It will be appreciated that base 16 may take any other desired form including one that does not include legs for engaging the floor but instead is a tabletop unit. A generally planar platform 22 is coupled to an upper end of the base 16 and defines a working surface 24 which supports the foam pad 14. The base 16 and platform 22 may be made from any suitable structural material, such as steel, aluminum, wood, rigid plastic and other materials as recognized by those of ordinary skill in the art. The base 16 and platform 22 may be made from the same material or be made from different materials as desired.

To make the apparatus 10 more ergonomic, the platform 22 is pivotally coupled with the base 16 so that the angle the platform 22 makes with base 16 may be selectively changed to accommodate different sized operators (not shown) and provide more comfortable operating conditions. For instance, the platform 22 may include an actuator (not shown), such as a pneumatic cylinder, to pivot the platform 22 and to hold the platform 22 at a fixed angle with respect to base 16. In a similar manner, the legs 18 may also be adjustable so as to selectively change the height of the platform 22 with respect to the ground 20. Those of ordinary skill in the art will recognize other ways to change the angle the platform 22 makes with the base 16 or the height of platform 22.

The apparatus 10 further includes a plurality of actuators 32 that project from the working surface 24. The actuators 32 may be arranged as desired so as to accommodate a specific application. For instance, as shown in FIG. 1, the actuators 32 may be arranged in two rows corresponding to seams between contoured portions of the foam pad 14, as discussed in more detail below. In an advantageous aspect of the invention, the actuators 32 are capable of movement toward and away from the working surface 24. Those of ordinary skill in the art will recognize that a wide variety of actuators may be used in the invention. In an exemplary embodiment, however, the actuators 32 may be linear actuators that move in a direction substantially perpendicular to working surface 24. Moreover, the actuators 32 may be operated in any suitable manner, but preferably are pneumatic actuators that may be coupled with a pressurized air supply 34.

Each of the actuators 32 includes a pair of retaining fingers 36 positioned at an end of the actuator 32 which are movable between an open position and a closed position. In the open position, the retaining fingers 36 are adapted to receive an object, such as a connecting member, therebetween. In the closed position, the retaining fingers 36 are adapted to grasp and secure the object to the actuators 32. As recognized by those of ordinary skill in the art, the retaining fingers 36 may be operated in a wide variety of ways, but preferably are pneumatically operated. Thus, for example, when air pressure is applied, the retaining fingers 36 are in an open position and when the air pressure is released, the retaining fingers 36 are in a closed position. To this end, the retaining fingers 36 may also be coupled to air supply 34.

The apparatus 10 may further include a controller, generally shown at 38, for controlling the movement of the actuators 32 and the retaining fingers 36. It should be recognized that while the preferred embodiment shows controlling the actuators 32 and retaining fingers 36 with the same controller 38, multiple controllers may be used in the invention. Moreover, in one embodiment, the apparatus 10 includes a switch 40 coupled with controller 38 which may be manually activated, such as by an operator, to move the actuators 32 and the retaining fingers 36. By way of example, switch 40 may include a foot pedal, hand switch, finger switch or other switches known in the art such that activation of the switch 40 moves the actuators 32 away from and toward working surface 24. In a similar manner, activation of switch 40 may also move the retaining fingers 36 between the open and closed positions. Again, it should be recognized that while one switch 40 is shown for activating the actuators 32 and retaining fingers 36, multiple switches may be used in the invention. In an alternate embodiment of the invention, the movement of the actuators 32 and retaining fingers 36 may be automated, such as by programming the controller 38 to move the actuators 32 and retaining fingers 36 in a timed sequence.

The apparatus 10 may further include a plurality of supports 42 projecting from working surface 24 and, as explained in more detail below, are adapted to support a connecting member in foam pad 14 during securement of the trim cover 12 with foam pad 14. The supports 42 may be adjustable so as to selectively change the height of supports 42 relative to the working surface 24. In one embodiment, the supports 42 include a mushroom shaped head 44 coupled with an end of threaded rod 46. The rod 46 is inserted through a bore 48 in platform 22. A first stop 50 may be coupled with the threaded rod 46 and positioned adjacent the working surface 24. For instance, the first stop 50 may be a suitable washer and nut. A second stop 52 may also be coupled with the thread rod 46 and positioned adjacent a back surface 54 of platform 22. The second stop 52 may also be a suitable washer and nut. By moving first and second stops 50, 52, the height of the supports 42 with respect to the working surface 24 may be changed. As with the actuators 32, the supports 42 may be arranged as desired so as to accommodate a specific application. For instance, as shown in FIG. 1, the supports 42 may be arranged in two rows and located adjacent an associated actuator 32.

The apparatus 10 as described above is adapted to be used to secure the trim cover 12 with the foam pad 14. To this end, the trim cover 12 includes a first connecting member 56 and the foam pad 14 includes a second connecting member 58 wherein when the first and second connecting members 56, 58 are engaged, the trim cover 12 is secured to the foam pad 14. Bottom seat and back cushions in many automotive seat assemblies are often times contoured, i.e., including multiple portions with different shapes. The various contours in a seat cushion may be formed by corresponding contours in the foam pad 14. For illustrative purposes, the foam pad 14 shown in FIGS. 2A and 3A includes a first portion 60 that is generally planar and an adjoining second portion 62 on one edge of first portion 60 that has a generally arcuate shape. Another portion similar to second portion 62 may be located on an opposed edge of first portion 60, such as shown in FIG. 1. Collectively, the first and second portions 60, 62 give the seat cushion a contoured aspect, which adds to the overall aesthetic appeal of the seat assembly and automotive interior.

Figure 2A:
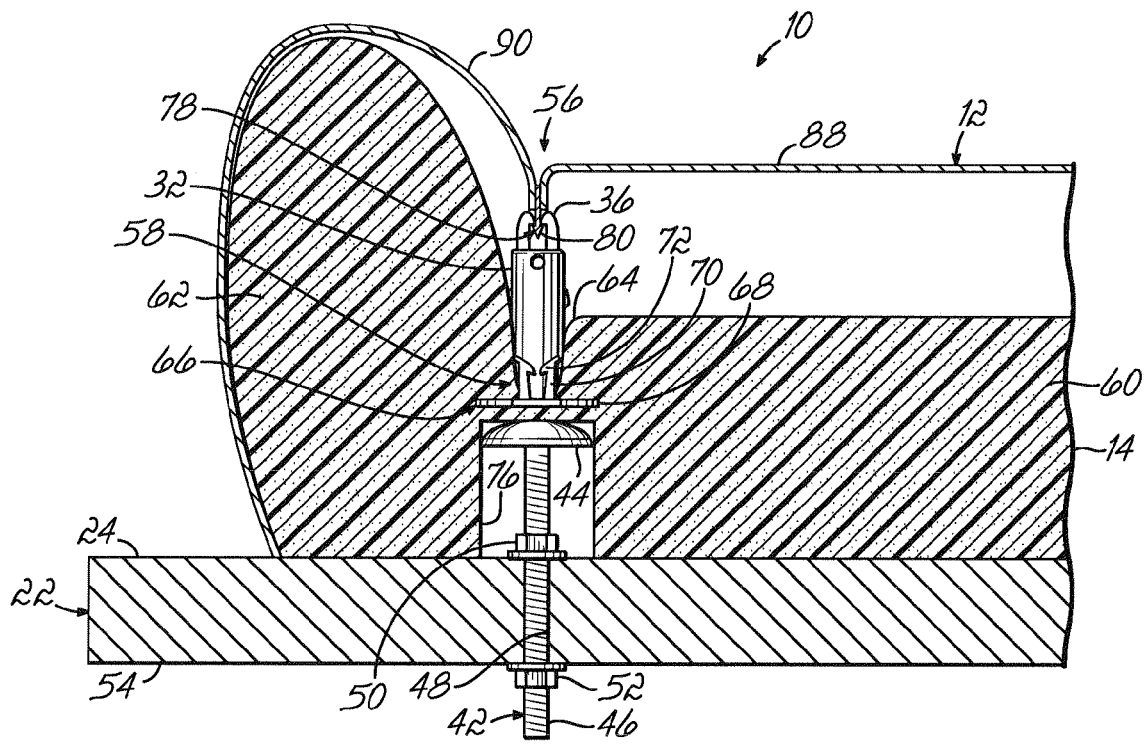
FIG. 2A is a partial cross-sectional view of FIG. 2 generally along line 2A-2A.
Figure 3A:
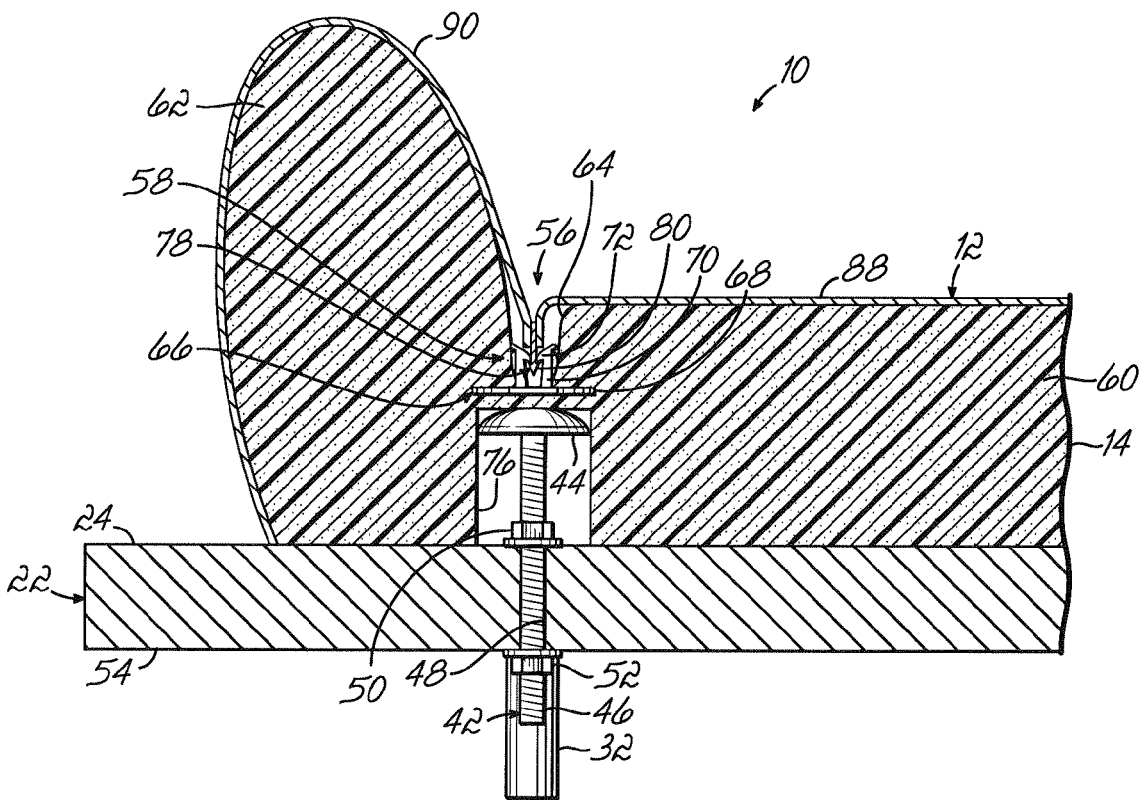
FIG. 3A is a partial cross-sectional view of FIG. 3 generally along line 3A-3A.
Figure 3:
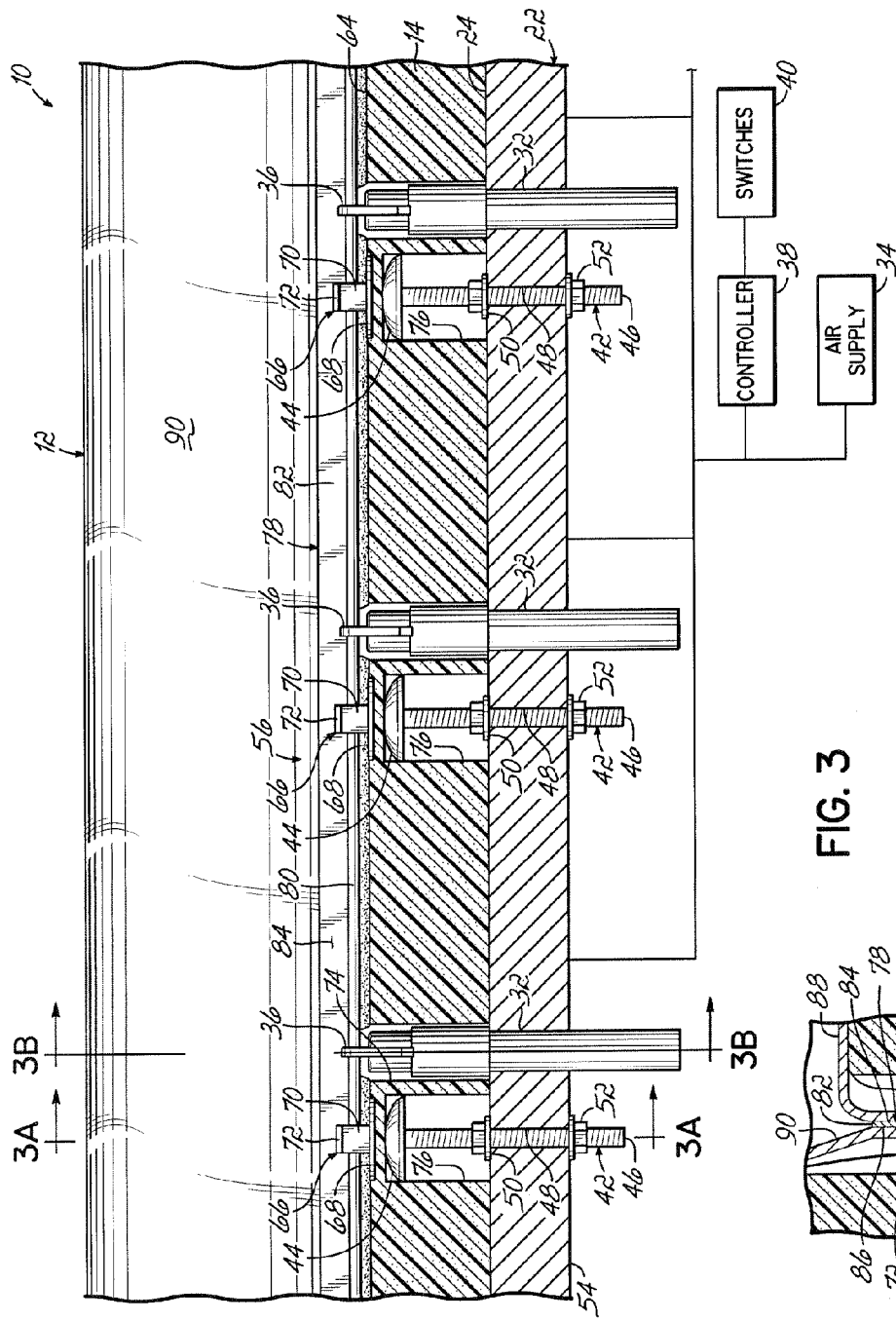
FIG. 3 is a partial cross-sectional view of the apparatus of FIG. 1 with the trim cover secured with the foam pad.
Figure 3B:
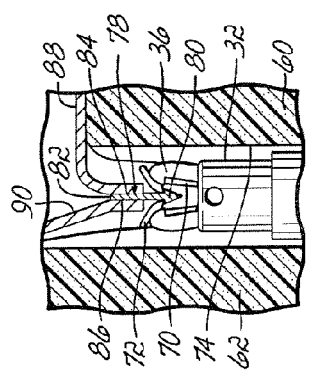
FIG. 3B is a partial cross-sectional view of FIG. 3 generally along line 3B-3B.

To facilitate covering the foam pad 14 with trim cover 12, foam pad 14 includes a trench 64 along the edge between the first and second portions 60, 62. The trim cover 12 couples with the foam pad 14 along trench 64 so as to form a seam between the two portions 60, 62 (as seen from a top view of the cushion) when the trim cover 12 is secured with the foam pad 14. To this end, the foam pad 14 includes second connecting member 58. Second connecting member 58 may generally include one or more members adapted to cooperate with another member(s) to secure an object to the foam pad 14. In an exemplary embodiment, and as shown in FIGS. 2, 2A, 3 and 3A, the second connecting member 58 may include a plurality of clips 66 spaced along trench 64. As best shown in FIGS. 2A and 3A, the clips 66 may include a generally circular base 68 and a pair of spaced apart arms 70 projecting therefrom. Each arm 70 includes a projection 72 on confronting inner surfaces. The arms 70 on clips 66 are adapted to elastically deform outwardly so as to receive the first connecting member 56 therein. The clips 66 may be coupled with the foam pad 14 during the manufacturing of foam pad 14. For instance, foam pad 14 may be formed through an injection molding process wherein the clips 66 are positioned in the mold (not shown) prior to injection and upon subsequent injection and curing of the foam material, the base 68 of each clip 66 is encased within the foam pad 14 while the arms 70 are positioned within the trench 64, as shown in these figures.

A foam pad 14 particularly adapted to be used with apparatus 10 also includes a plurality of apertures 74 extending completely through the foam pad 14 and along trench 64. The apertures 74 are adapted to receive an associated actuator 32 therein when the foam pad 14 is placed on the working surface 24. Preferably, the apertures 74 are positioned adjacent to the clips 66 so that when the foam pad 14 is placed on working surface 24, there is an actuator 32 associated with each clip 66 (FIG. 1). In addition, foam pad 14 includes a plurality of blind bores 76 formed therein that register with clips 66. The bores 76 stop short of clips 66 and are adapted to receive an associated support 42 therein. In this way, when the foam pad 14 is placed on the working surface 24, the head 44 of support 42 is just below the base 68 of clip 66. This configuration limits movement of the clip 66 toward the working surface 24.

The trim cover 12 used to cover foam pad 14 may be any suitable aesthetically pleasing material such as cloth, leather, vinyl, etc. To facilitate securing the trim cover 12 with the foam pad 14, the trim cover 12 includes a first connecting member 56. First connecting member 56 may generally include one or more members adapted to cooperate with another member(s) to secure an object to the trim cover 12. As shown in FIGS. 1-3B, the first connecting member 56 may include a connecting strip 78. As best shown in FIGS. 2A-3B, connecting strip 78 includes an arrow shaped head 80 coupled at one end of an extending tab 82 having first and second opposed sides 84, 86. Trim cover 12 includes a plurality of portions corresponding to the contoured portions in foam pad 14. Thus, trim cover 12 includes a first portion 88 adapted to overlie and cover first portion 60 in foam pad 14 and a second portion 90 adapted to overlie and cover second portion 62 in foam pad 14. Adjacent ends of first and second portions 88, 90 in trim cover 12 are coupled to sides 84, 86 of extending tab 82. This may be accomplished, for example, by sewing the ends of first and second portions 88, 90 with extending tab 82. Those of ordinary skill in the art will recognize other methods for coupling the trim cover 12 with the connecting strip 78.

A method of using apparatus 10 to secure trim cover 12 with foam pad 14 will now be described. An operator typically places the foam pad 14 onto the working surface 24 of apparatus 10. The foam pad 14 is placed on working surface 24 such that the actuators 32 extend through apertures 74 in foam pad 14 and the supports 42 are located in blind bores 76 so as to support the second connecting member 58, such as clips 66 embedded within the foam pad 14. Those of ordinary skill in the art will recognize that the foam pad 14 may be placed on working surface 24 and then actuators 32 moved away from working surface 24 so as to completely extend through apertures 74 in foam pad 14. The trim cover 12 carrying the first connecting member 56, such as connecting strip 78, is positioned to overlie the foam pad 14 and the connecting strip 78 is aligned with the clips 66 in the foam pad 14. The retaining fingers 36 are moved to an open position so as to receive the arrow-shaped head 80 therebetween.

The retaining fingers 36 are then moved to a closed position so as to grasp the arrow-shaped head 80 on connecting strip 78. The actuators 32 are then moved toward the working surface 24 so that the arrow-shaped head 80 engages the arms 70 on clips 66 and deforms them outwardly as the actuators 32 move toward working surface 24. As the head 80 engages the arms 70, the supports 42 prevent movement of the clips 66 toward working surface 24 thus causing relative motion between the first and second connecting members 56, 68. When the arrow-shaped head 80 clears the projection 72 on arms 70, the arms 70 snap inwardly so as to couple the connecting strip 78 with the clips 66 thereby securing the trim cover 12 with the foam pad 14. The movement of the actuators 32 toward the working surface 24 is stopped and the retaining fingers 36 are moved to the open position so as to release the connecting strip 78 therefrom. The operator may then remove the coupled trim cover 12 and foam pad 14 from the apparatus 10. The process may then be repeated to form additional seat cushions.

As described above, the movement of the actuators 32 away from and toward the working surface 24 and movement of the retaining fingers 36 between the open and closed positions may be accomplished by activating switch 40. Thus for example, repeated activation of switch 40 may respectively cause: i) the actuators 32 to move away from working surface 24; ii) the retaining fingers 36 to move to a closed position; iii) the actuators 32 to move toward the working surface 24; and iv) the retaining fingers 36 to move to an open position. The controller 38 may also be programmed to perform these steps in a timed sequence.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. An apparatus for securing a trim cover having a first connecting member to a foam pad having a second connecting member, the apparatus comprising:
   a base;
   a platform defining a working surface and coupled to said base, said platform adapted to support the foam pad thereon;
   a plurality of actuators projecting from said working surface and adapted to project through apertures in the foam pad, each said actuator capable of movement away from and toward said working surface and including a pair of retaining fingers at one end thereof movable between an open position and a closed position,
   wherein said retaining fingers are adapted to grasp the first connecting member on the trim cover and move the first connecting member toward said working surface as said actuators move toward said working surface so as to engage the first connecting member with the second connecting member and thereby secure the trim cover to the foam pad; and
   a plurality of supports projecting from said working surface and adapted to support the second connecting member during engagement of the first connecting member to the second connecting member.

2. The apparatus of claim 1, wherein said platform is pivotally coupled with said base so as to selectively change an angle said platform forms with said base.

3. The apparatus of claim 1, wherein said actuators are linear actuators capable of movement in a direction substantially perpendicular to said working surface.

4. The apparatus of claim 1, wherein said actuators are pneumatic actuators.

5. The apparatus of claim 1, further comprising:
   a controller for controlling the movement of said actuators away from and toward said working surface in a timed sequence.

6. The apparatus of claim 5, wherein said controller controls the movement of said retaining fingers between the open and closed positions in a timed sequence.

7. The apparatus of claim 1, wherein each said support is adjustable so as to selectively change the height of said support with respect to the working surface.

8. The apparatus of claim 1, wherein each said support is adjacent an associated actuator.

* * * * *